United States Patent
Amell et al.

(10) Patent No.: US 6,366,262 B1
(45) Date of Patent: Apr. 2, 2002

(54) METHOD AND APPARATUS FOR SUPPORTING MULTIPLE NPT DISPLAY SESSIONS ON A SINGLE ADDRESS

(75) Inventors: Steven Joseph Amell; Harvey Gene Kiel, both of Rochester; Raymond Francis Romon, Oronoco, all of MN (US); Shoji Okimoto, Fujisawa; Toshio Shimizu, Sagamihara, both of (JP)

(73) Assignee: International Business Machines Corporation, Armonk, NY (US)

( * ) Notice: Subject to any disclaimer, the term of this patent is extended or adjusted under 35 U.S.C. 154(b) by 1218 days.

(21) Appl. No.: 08/813,864

(22) Filed: Mar. 7, 1997

Related U.S. Application Data

(63) Continuation of application No. 08/242,494, filed on May 13, 1994, now abandoned.

(51) Int. Cl.[7] ................................................ G09G 5/00
(52) U.S. Cl. .................... 345/1.2; 345/733; 345/750; 345/1.1; 709/300; 710/263; 710/109
(58) Field of Search .................................... 395/329, 501, 395/401, 402, 284, 292, 733, 737; 345/1–3, 168, 329, 330, 331, 501, 733–738, 750–751, 1.1–2.3; 463/42; 709/300, 301; 710/260, 263, 264, 266, 267, 3, 104, 109, 112

(56) References Cited

U.S. PATENT DOCUMENTS

| | | | |
|---|---|---|---|
| 4,063,220 A | * 12/1977 | Metcalfe et al. | 340/825.5 |
| 4,458,331 A | 7/1984 | Amezcua et al. | 395/144 |
| 4,791,566 A | 12/1988 | Sudama et al. | 395/285 |
| 4,800,380 A | * 1/1989 | Lowenthal et al. | 345/200 |
| 4,868,782 A | 9/1989 | Lawrence et al. | 395/200 |
| 4,918,598 A | * 4/1990 | Ashkin et al. | 364/200 |
| 4,949,300 A | * 8/1990 | Christenson et al. | 345/900 |
| 4,996,685 A | 2/1991 | Farese et al. | 370/58.1 |
| 5,027,269 A | 6/1991 | Grant et al. | 395/650 |
| 5,043,881 A | 8/1991 | Hamazaki | 395/700 |
| 5,065,343 A | * 11/1991 | Inoue | 345/1 |
| 5,121,486 A | 6/1992 | Kurihara et al. | 395/311 |
| 5,165,020 A | 11/1992 | Sudama et al. | 136/251 |
| 5,255,358 A | * 10/1993 | Busboom et al. | 395/153 |
| 5,299,197 A | * 3/1994 | Schlafly | 395/161 |
| 5,359,660 A | * 10/1994 | Clark et al. | 380/25 |
| 5,437,014 A | * 7/1995 | Busboom et al. | 395/155 |
| 5,555,385 A | * 9/1996 | Osisek | 395/401 |
| 5,682,169 A | * 10/1997 | Botterill et al | 345/2 |
| 5,768,598 A | * 6/1998 | Marisetty et al. | 395/733 |

OTHER PUBLICATIONS

DuBois et al., "Method for Swithching DFT DLC Without Stopping 3270 Emulation Session," IBM Technical Disclosure Bulletin vol. 32, No. 11, pp. 127–128 Apr. 1990.

Hansen et al., "Multiple PC/5250 Sessions Without Unique Code," IMB Technical Disclosure Bulletin vol. 29, No. 1, Jun. 1986, pp. 283–284.

Luger et al., "Dynamic Emulated Twinax Session Definition," IBM Technical Disclosure Bulletin vol. 31, No. 8, Jan. 1989, pp.86–92.

* cited by examiner

Primary Examiner—Lun-Yi Lao
(74) Attorney, Agent, or Firm—Joan Pennington

(57) ABSTRACT

A method and apparatus are provided for supporting multiple display sessions through a single address on a non-programmable-terminal (NPT) attached to a host computer by a work station controller (WSC). The WSC enables shared addressing of multiple display sessions on the NPT. The WSC changes focus to a selected one of the multiple display sessions responsive to receiving from the host computer a data stream for a requested display session not having the focus and responsive to receiving a change focus request from the NPT. The NPT may have one display session active for the user interface and a different display session having the focus communicating with the host computer, which is transparent to the user and to the host computer.

21 Claims, 15 Drawing Sheets

METHOD AND APPARATUS FOR SUPPORTING MULTIPLE NPT DISPLAY SESSIONS ON A SINGLE ADDRESS

This application is a continuation of application Ser. No. 08/242,494 filed May 13, 1994, now abandoned.

BACKGROUND OF THE INVENTION

1. Field of the Invention

The present invention relates to a computer system, and more particularly to a method and apparatus for supporting multiple display sessions through a single address on a non-programmable-terminal (NPT) attached to a host computer.

2. Description of the Prior Art

Known non-programmable, non-graphical, character-based terminals (NPTs), which attach to a host computer, such as an IBM AS/400, can support multiple display sessions and a single printer session simultaneously. Typically, the NPTs can display one or more display sessions at the same time using split screen formats that divide the physical screen between two or more sessions. Split screens allow the user to work in one session while monitoring the status of other sessions. Typically the NPTs are attached to the AS/400 via a twinaxial cable. The NPTs require the support of a workstation controller (WSC) for keystroke handling, screen/field management, and the like. Typically the WSC has seven available physical addresses for each multidrop, daisy-chained twinaxial cable port. In the known conventional arrangements, each NPT session requires a physical address. In order to support multiple display sessions on the NPT, an address is assigned to each session. If an NPT is supporting three display sessions and a printer session, for example, the NPT uses four addresses of the seven available addresses. As a result, two NPTs, each of which being configured as supporting three display sessions and a printer session, cannot be connected to the AS/400 through a single port. As the use of multiple sessions by customers increases, this restriction on the number of NPTs on a single port presents a problem.

Also, the total capacity of the WSC is reduced. For example, a WSC may support up to 40 sessions. This formerly meant that 40 physical devices were supported. However, with the NPT supporting four sessions, as few as ten physical devices can be supported. In order to support new devices, additional twinaxial cables and additional WSCs can be required.

Some programmable workstations (PWS) use the support of more than seven sessions on a single port by directly communicating with the host computer. However, this method cannot be used for an NPT since it requires a more powerful central processing unit (CPU) and much greater storage/memory capacity than the current NPTs accommodate. Supporting such a CPU and a large amount of storage/memory in the terminal not only makes it difficult to maintain but also results in the considerable price increase which is unacceptable for any NPT.

SUMMARY OF THE INVENTION

Important objects of the present invention are to provide a method and apparatus for supporting multiple display sessions through a single address on a non-programmable-terminal (NPT) attached to a host computer; to provide such method and apparatus substantially without negative effects; and to provide such method and apparatus that overcome many of the disadvantages of prior art arrangements.

In brief, the objects and advantages of the present invention are achieved by a method and apparatus for supporting multiple display sessions through a single address on a non-programmable-terminal (NPT) attached to a host computer by a work station controller (WSC). The WSC enables shared addressing of multiple display sessions on the NPT. The WSC changes focus to a selected one of the multiple display sessions responsive to receiving from the host computer a data stream for a requested display session not having the focus and responsive to receiving a change focus request from the NPT.

BRIEF DESCRIPTION OF THE DRAWING

The present invention, together with the above and other objects and advantages, can best be understood from the following detailed description of the embodiment of the invention illustrated in the drawing, wherein:

FIG. 2 is a timing diagram illustrating sequential commands between a workstation controller (WSC) and a non-programmable terminal (NPT) of FIG. 1 when the NPT is turned on;

DETAILED DESCRIPTION OF THE PREFERRED EMBODIMENTS

Figure 1:
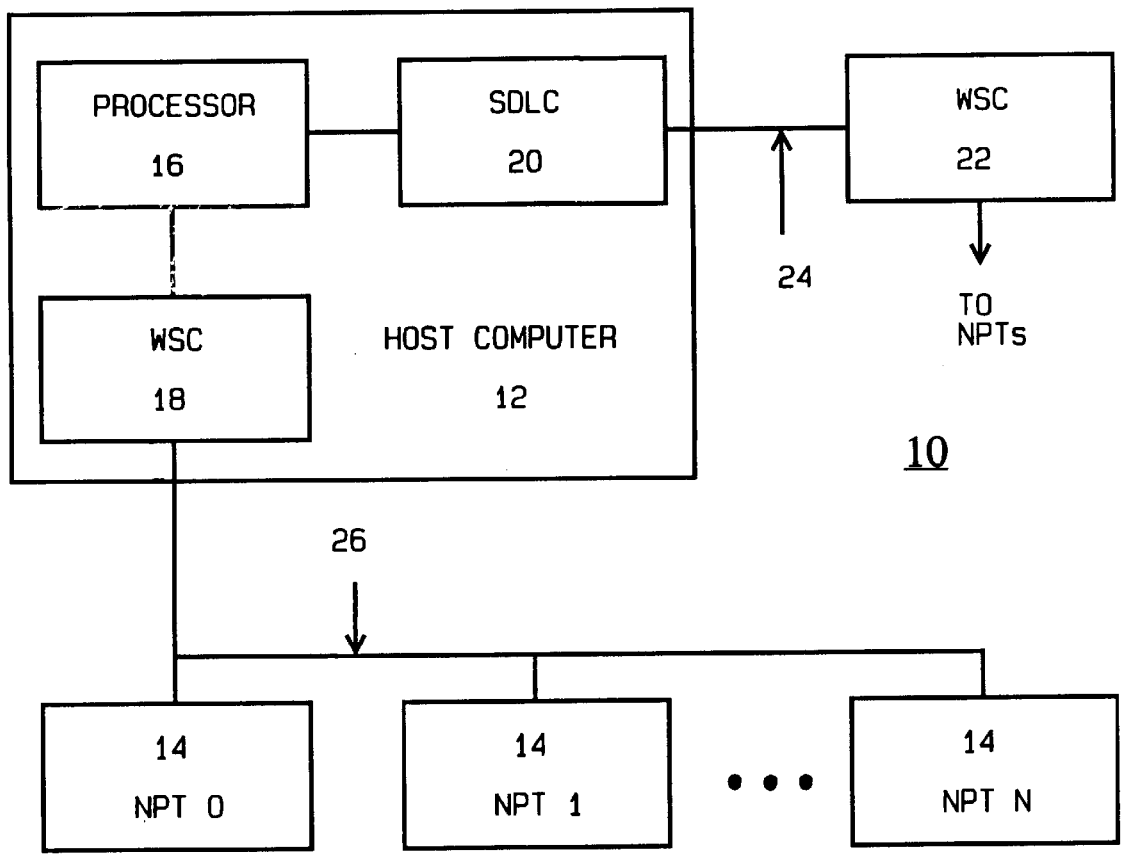
FIG. 1 is a block diagram representation of a computer or data processing system embodying the present invention.
Figure 1A:
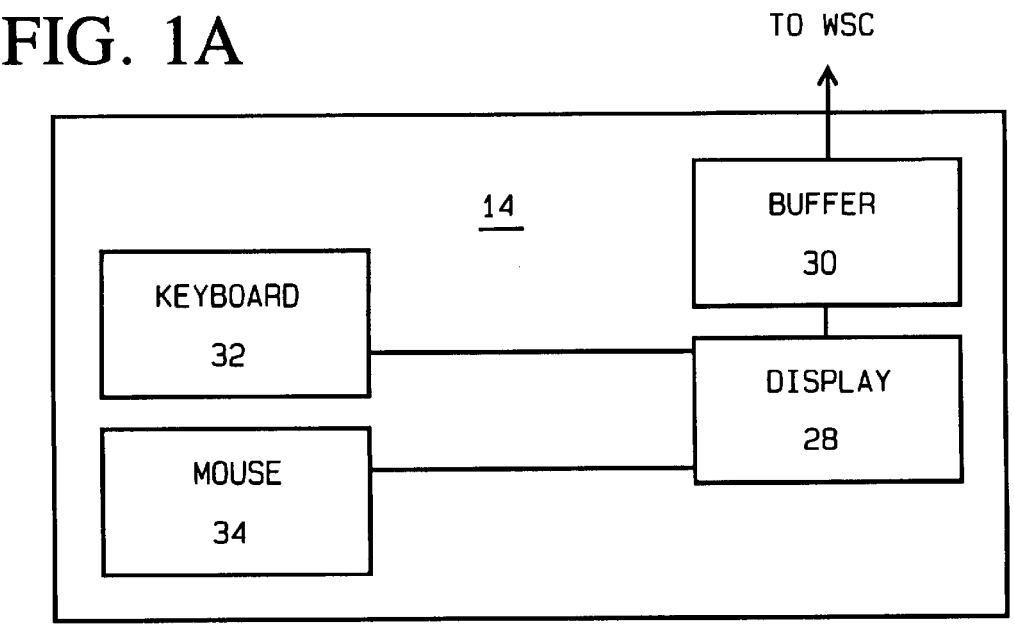
FIG. 1A is a block diagram illustrating a non-programmable terminal of FIG. 1.

Referring now to the drawing, FIGS. 1 and 1A together show a block diagram of computer system 10 of the invention. Computer system 10 consists of a host computer 12 and a plurality of non-programmable terminals (NPTs) 14. Host computer 12 contains a processor 16 connected to at least one work station controller (WSC) 18 and an optional synchronous data line controller (SDLC) 20 used with a remote WSC 22 connected via an SDLC link 24, or other communications protocol can be used with the remote WSC 22. WSC 18 or 22 is connected via a multidrop, daisy chained twinaxial cable 26 to the terminals 14. NPTs 14 attached to a local WSC 18 or a remote WSC 22 are identical devices. Having reference to FIG. 1A, NPTs 14 include a display 28, a memory or buffer 30, a keyboard 32 and an optional mouse 34. Data processing system 10 is illustrated in simplified form sufficient for an understanding of the present invention because the utility of the present invention is not limited to details of a particular system.

WSC 18 polls the NPTs 14 to pass keystrokes and screen data between the NPTs 14 and the host processor 16. WSC 18 writes the keystroke and screen data to the NPT display 28. The NPTs' memory 30 enables keystroke buffering in the NPT 14. For example, memory 30 stores a queue, for example, such as, four keystroke or mouse events.

Various commercially available devices can be used in computer system 10. For example, host computer 12 can be the Application System (AS/400) manufactured by International Business Machines Corporation of Armonk, New York or in conjunction with a number of mainframe computers. The terminal 14 can be an IBM 5250 non-programmable display terminal, and WSC 18 can be an IBM Workstation I/O Processor, Type 6050 or remote 5494 workstation controller. A suitably programmed personal computer can emulate an NPT and can be used for NPT 14.

In accordance with a feature of the invention, multiple display sessions share a single address or use shared addressing. One of the advantages of the shared addressing is its simplicity. The invention introduces a concept called focus. At a given time, only one of the multiple display sessions has the focus. The display session which has the focus communicates with the WSC as if the session were the single display session available on the shared address. Neither a hardware change nor a significant protocol change is required, and the backward compatibility is easily assured. From the NPTs' point of view, the shared addressing function can be achieved effectively and easily without requiring any hardware changes which may result in a price increase. No functional regression accompanies the support of the shared addressing, for example, an old workstation controller that does not support shared addressing can be used with new NPTs 14 or a new WSC 18 can be used with old NPTs that do not support shared addressing.

Any session which does not have the focus is invisible from a communication viewpoint until the focus is passed to the session. The focus is passed from one session to another by a twinaxial focus change command sent from the WSC 18 to the NPT 14. If the WSC 18 needs to communicate with a second session which does not have the focus, the WSC has to send the new twinaxial command beforehand so that the second session gets the focus. NPT 14 may have one active session for the user interface or the session the user is working with which does not have the focus, and a different session having the focus simultaneously communicating with the host processor 16. This is transparent to the user and to the host. WSC 18 may be sending commands to the inactive user interface sessions in response to data from the host. An input from the operator via the keyboard and/or mouse through the user active session is not passed to the WSC 18 until the active user interface session has the focus. If the input is made in a session which does not have the focus, the input is queued and the NPT 14 requests the WSC to change the focus through the session which currently has the focus. Upon receipt of the change focus request, the WSC will generally send the twinaxial change focus command to pass the focus to the active user interface session; and the NPT 14 informs the WSC 18 of the input which has been queued while the session did not have the focus.

NPT 14 can include a jump key on keyboard 32 in FIG. 1A used by the operator for selecting a user interface active display session. When the user presses the jump key, NPT 14 does not send a change focus request. In other words, the jump key does not change the display session having the focus.

Keystroke buffering by memory 30 is used when a user is typing faster than WSC 18 sends polls and processes the keystrokes, for example, when a user presses keys in an inactive display session. Focus changes occur at a rapid rate, such that end users are not aware of the underlying WSC focus changes. What a user views as an active display screen is different than the display session that is actually active or has focus on the twinaxial cable 26. Twinaxial protocol between the WSC 18 and NPT 14 includes a typical time between polls by the WSC 18 of about 16 milliseconds, a typical response time by the NPT 14 to commands from the WSC 18 of about 100 microseconds and a typical time between WSC checks of each unused twinaxial address to start the bring-up sequence of about 6–7 seconds.

Figure 2:
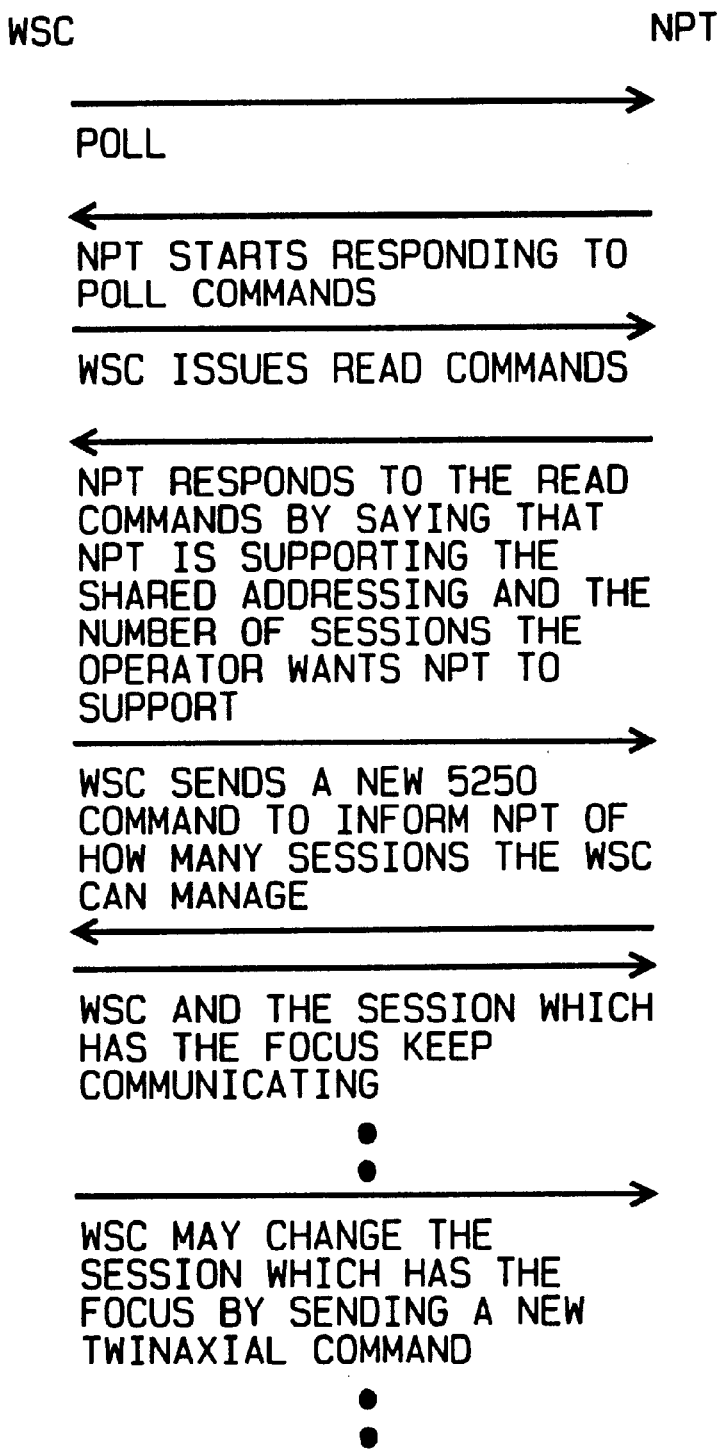

FIG. 2 shows a high-level sequence of commands between the WSC 18 and an NPT 14 to accomplish the multiple sessions through a single address starting from the time the NPT is turned on. The WSC periodically polls all possible addresses. First NPT 14 starts responding to poll commands from the WSC 18. Next WSC 18 issues Read commands to identify the characteristics of NPT 14. NPT 14 responds to the Read commands by saying the NPT is supporting the shared addressing and the number of sessions the user wants the NPT to support. WSC 18 sends an Enable Shared Addressing command to inform NPT 14 of how many sessions the WSC can manage. The number of sessions that can be managed may be smaller than the number the end user of NPT requested via the NPT Setup Mode. WSC 18 and the session which has the focus keep communicating. WSC 18 may change the session which has the focus by sending a twinaxial change focus command as the result of either an NPT request for a focus change or when the host sends data to a session which does not have focus.

FIGS. 3A–3F together provide a timing diagram illustrating sequential commands between the WSC 18 and the NPT 14 for bring-up and active display session control. First WSC 18 sends a Set Mode command and NPT 14 sends a response to the WSC. Next WSC 18 sends a read type, model, keyboard ID command and NPT 14 sends read data of type, model, keyboard ID response. Then WSC 18 sends a Read Info command and NPT 14 sends a read info response, for example, with read data indicating outstanding status buffer is supported. WSC 18 then sends a Read Info to Outstanding Status Buffer command and NPT sends read data including a bit-flag requesting shared addressing and a requested number of shared sessions. Next WSC 18 sends an Enable Shared Addressing command including the number of shared sessions and NPT 14 sends a response. WSC 18 then sends a change focus command for display session 0 and NPT 14 sends a response. Next WSC 18 sends a Set Code Page command and NPT 14 sends a response. The Set Code Page command is used to define the language character set to use for this session; different sessions can use different languages. Then WSC 18 sends an NPT power-up command for display session 0 to the host computer processor 16. WSC 18 then sends a change focus for display session 1 and NPT 14 sends a response.

Figure 3A:
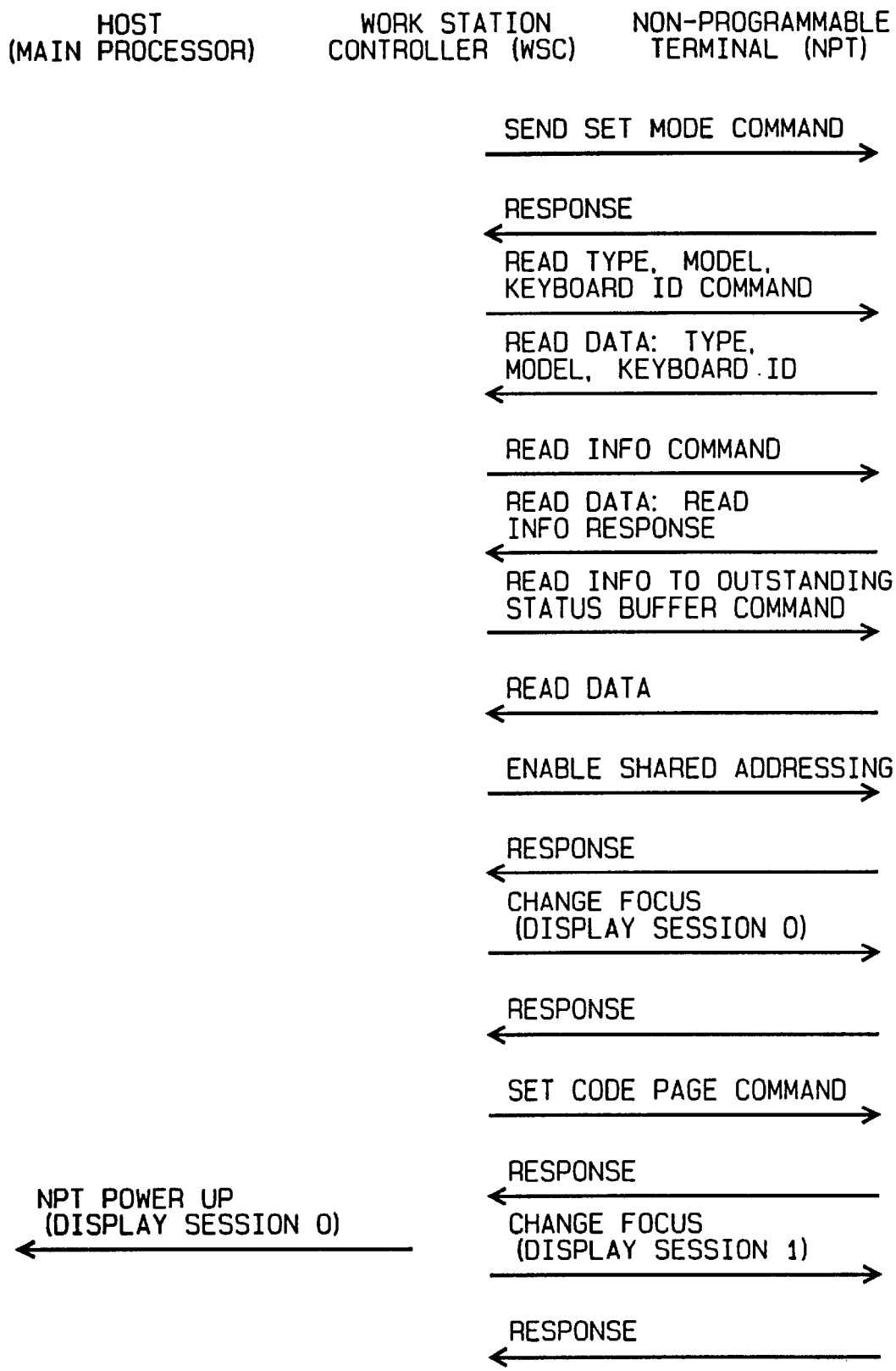
FIGS. 3A–3F together provide a more detailed timing diagram illustrating sequential commands between a workstation controller (WSC) and a non-programmable terminal (NPT) of FIG. 1 for bring-up and in-focus display session control.
Figure 3B:
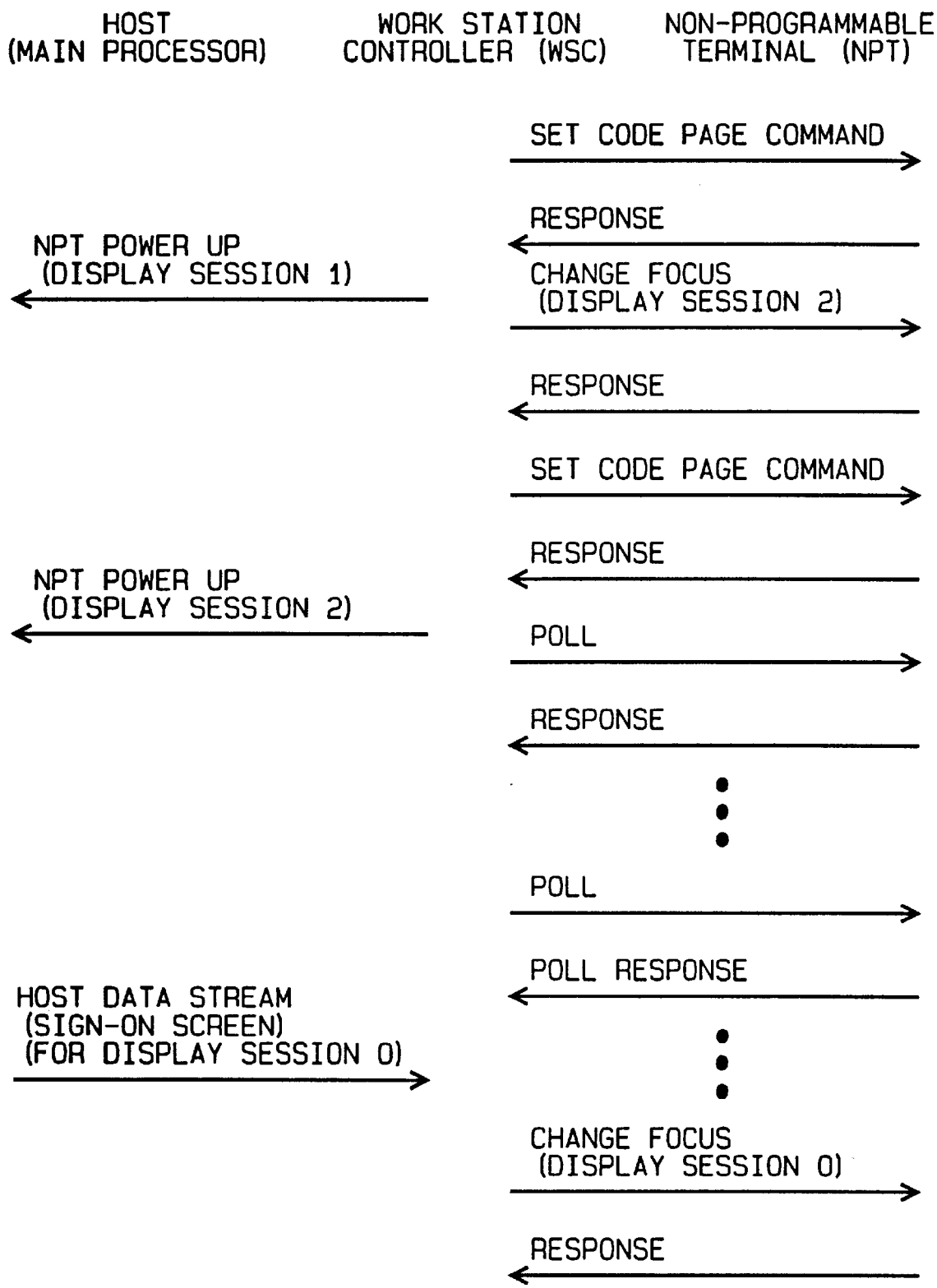

Having reference to FIG. 3B, next WSC 18 sends a Set Code Page command and NPT 14 sends a response. Then WSC 18 sends an NPT power-up command for display session 1 to the host computer processor 16. WSC 18 then sends a change focus for display session 2 and NPT 14 sends a response. Next WSC 18 sends a Set Code Page command and NPT 14 sends a response. Then WSC 18 sends an NPT power-up command for display session 2 to the host computer processor 16. Next WSC 18 sends a poll and NPT 14 sends a poll response. WSC 18 processing continues with sending polls and NPT 14 sending poll responses. A data stream is sent by host processor 16 to WSC 18 for a sign-on screen for display session 0. The WSC 18 sends a change focus command for display session 0 and NPT 14 sends a response.

Figure 3C:
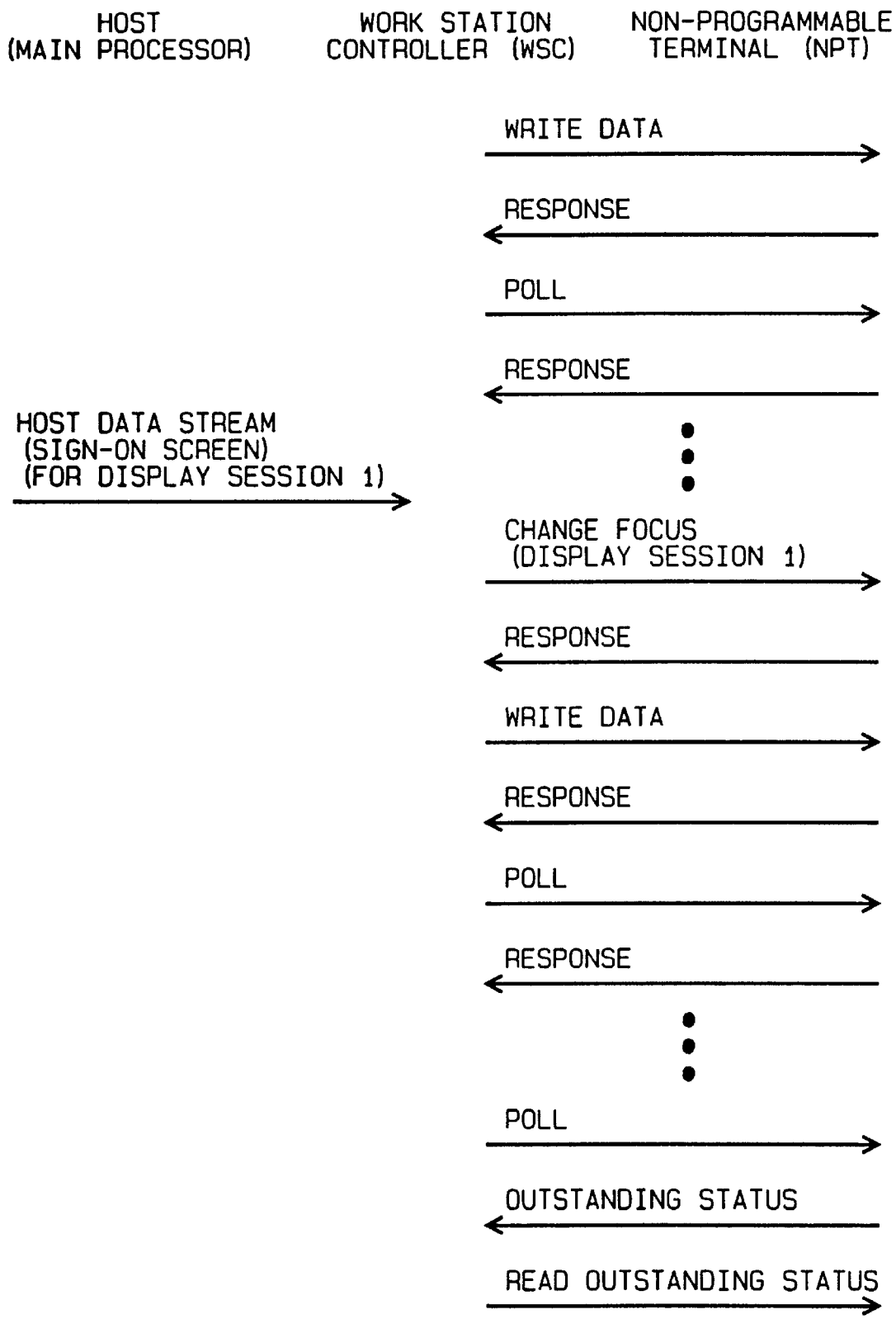

Having reference to FIG. 3C, next WSC 18 sends write data and NPT 14 sends a response. Then a number of polls are sent by the WSC 18 and NPT 14 sends respective poll responses. The user sees the sign-on screen for display session 0. Then the sequence continues with host processor 16 sending a data stream for a sign-on screen for display session 1 to the WSC 18. WSC 18 sends a change focus command for display session 1, write data and a number of polls and NPT 14 sends corresponding responses. Next NPT sends an Outstanding Status poll response, for example when the user presses a data key in display session 0 to begin the sign-on process. Then WSC 18 sends a Read Outstanding Status command.

Figure 3D:
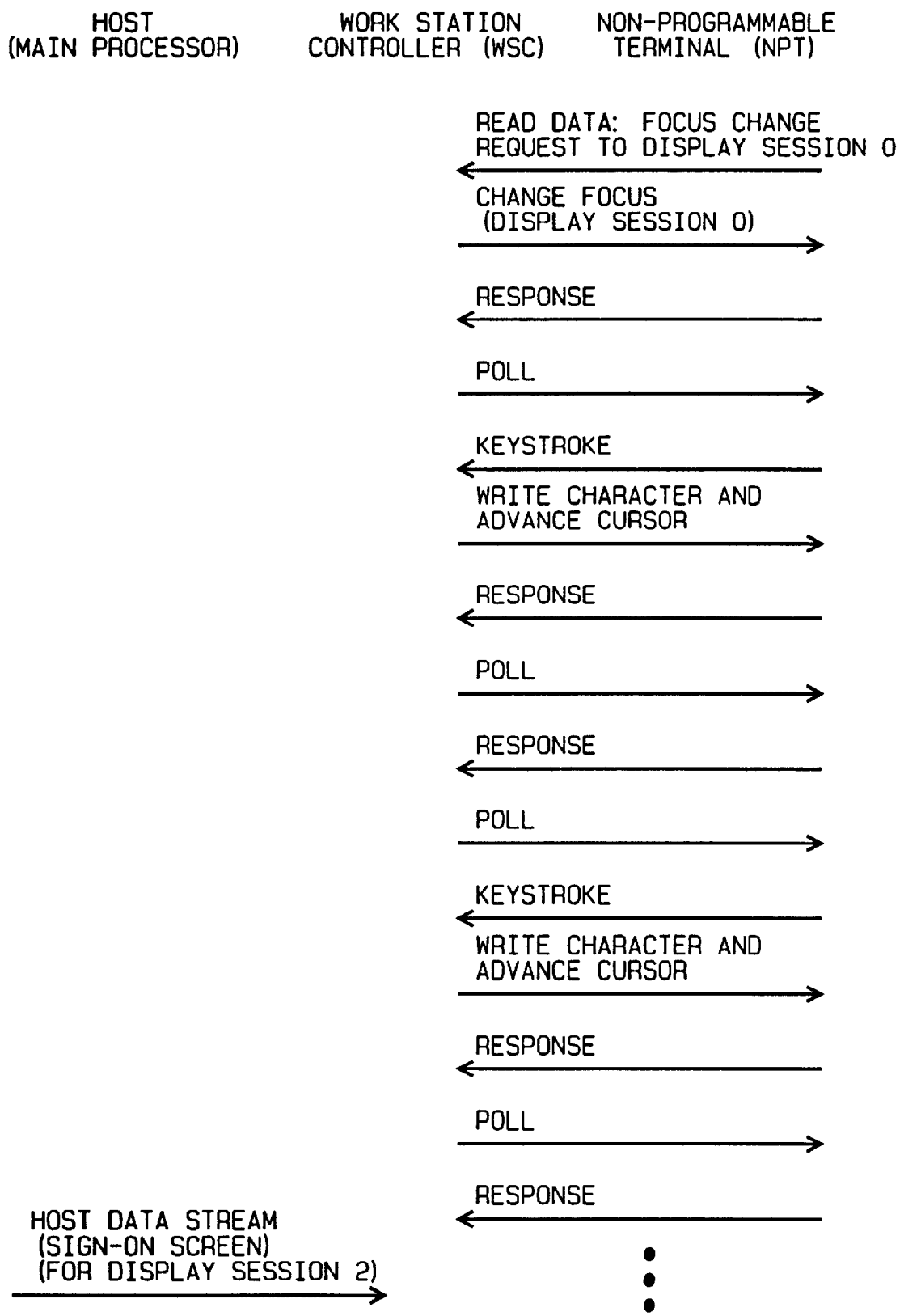

Having reference to FIG. 3D, then NPT 14 sends read data of a focus change request to display session 0. WSC 18 responds with a change focus command for the requested display session and NPT 14 sends a response. WSC 18 sends a poll and NPT 14 sends a keystroke. WSC 18 sends write character and advance cursor position and NPT 14 sends a response. WSC 18 sends a poll and NPT 14 sends a poll response. The user sees the character written and presses another data key. WSC 18 sends a poll and NPT 14 sends a keystroke. WSC 18 sends write character and advance cursor position and NPT 14 sends a response. WSC 18 sends a poll and NPT 14 sends a poll response. Host processor 16 sends a data stream for a sign-on screen for display session 2.

Figure 3E:
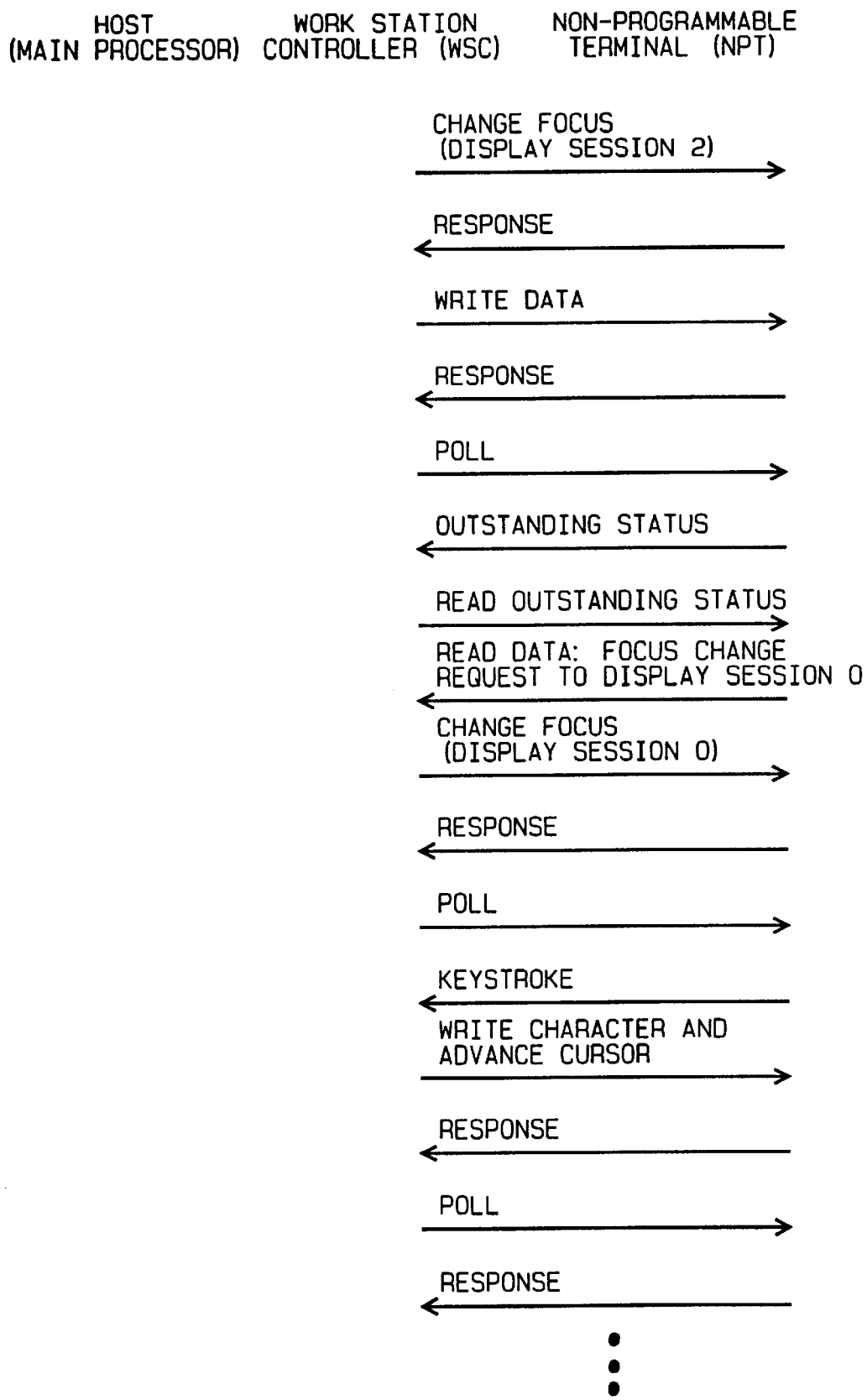

Having reference to FIG. 3E, WSC 18 sends a change focus command for display session 2 responsive to the host data stream, which is the sign-on screen for display session 2, and the NPT 14 sends a response. WSC 18 sends write data and NPT 14 sends a response. This data written by the WSC 18 is to a display session that appears inactive to the user, and typically would not appear on the display screen. WSC 18 sends a poll and NPT sends an Outstanding Status poll response as a result of a user keystroke. Then WSC 18 sends a Read Outstanding Status command. NPT 14 sends read data of a focus change request to display session 0. WSC 18 responds with a change focus command for the requested display session and NPT 14 sends a response. WSC 18 sends a poll and NPT 14 sends a keystroke. WSC 18 sends write character and advance cursor position and NPT 14 sends a response. WSC 18 sends a poll and NPT 14 sends a response.

Figure 3F:
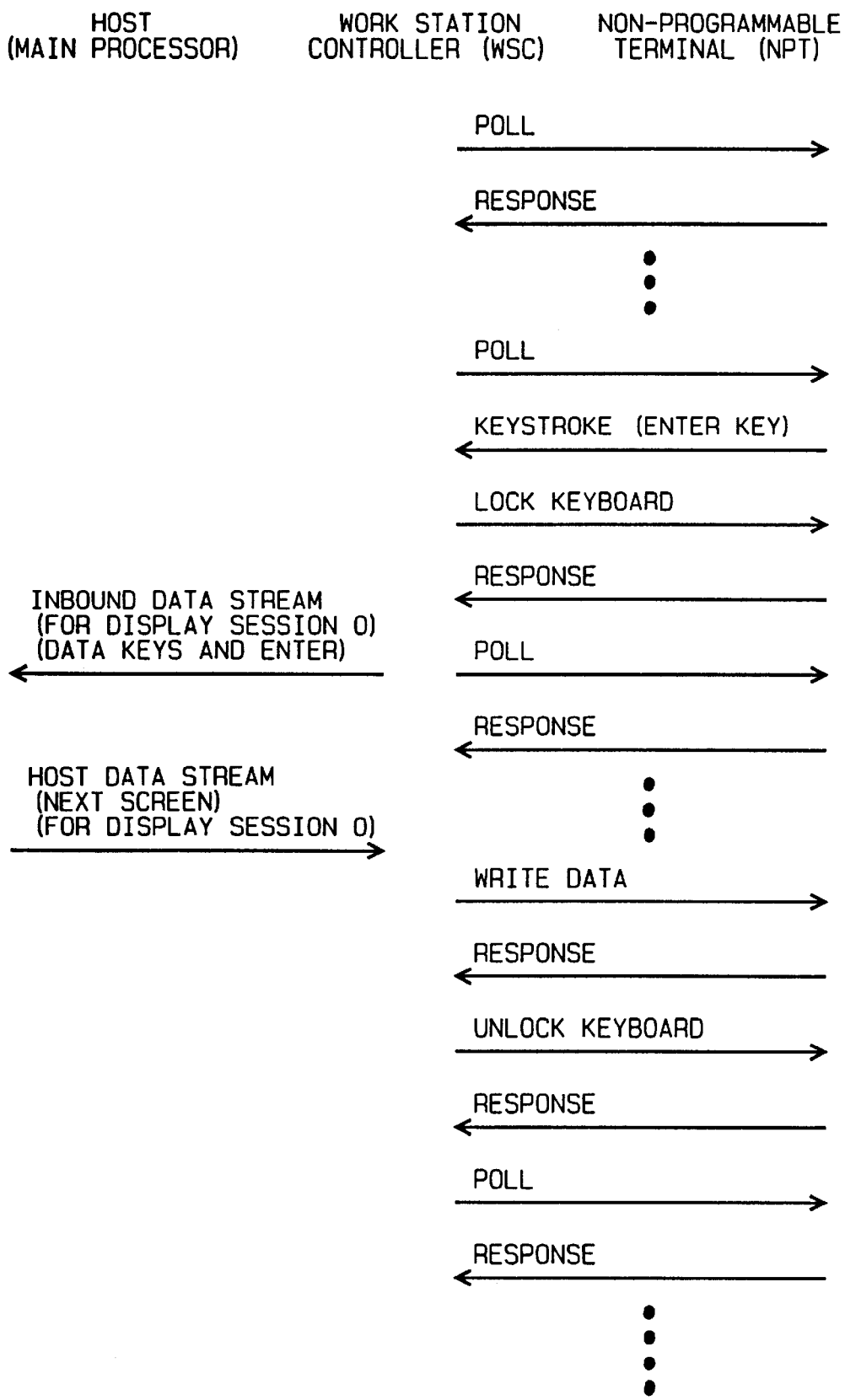

Having reference to FIG. 3F, WSC 18 sends polls and NPT 14 sends respective poll responses. The user sees the character written and presses the enter key. WSC 18 sends a poll and NPT 14 sends a keystroke for the enter key. WSC 18 sends a lock keyboard command and the NPT 14 sends a response. WSC 18 enables a user type-ahead with the keyboard being locked and processes the keystrokes after the keyboard unlocks. For example, when the user knows a set of display screens well, the user types some data keys and presses the enter key and then types some data keys for the next display screen which will be written.

WSC 18 sends a data stream for display session 0 to the host processor 16 for the data keys and enter key. Processing continues with WSC 18 sending polls and NPT 14 sending poll responses. Host processor 16 sends a data stream of the next screen for the display session 0. WSC 18 sends write data and NPT 14 sends a response. The user sees the next display screen. WSC 18 sends an Unlock Keyboard command and NPT 14 sends a response. WSC 18 then sends polls and NPT 14 sends poll responses.

Figure 4:
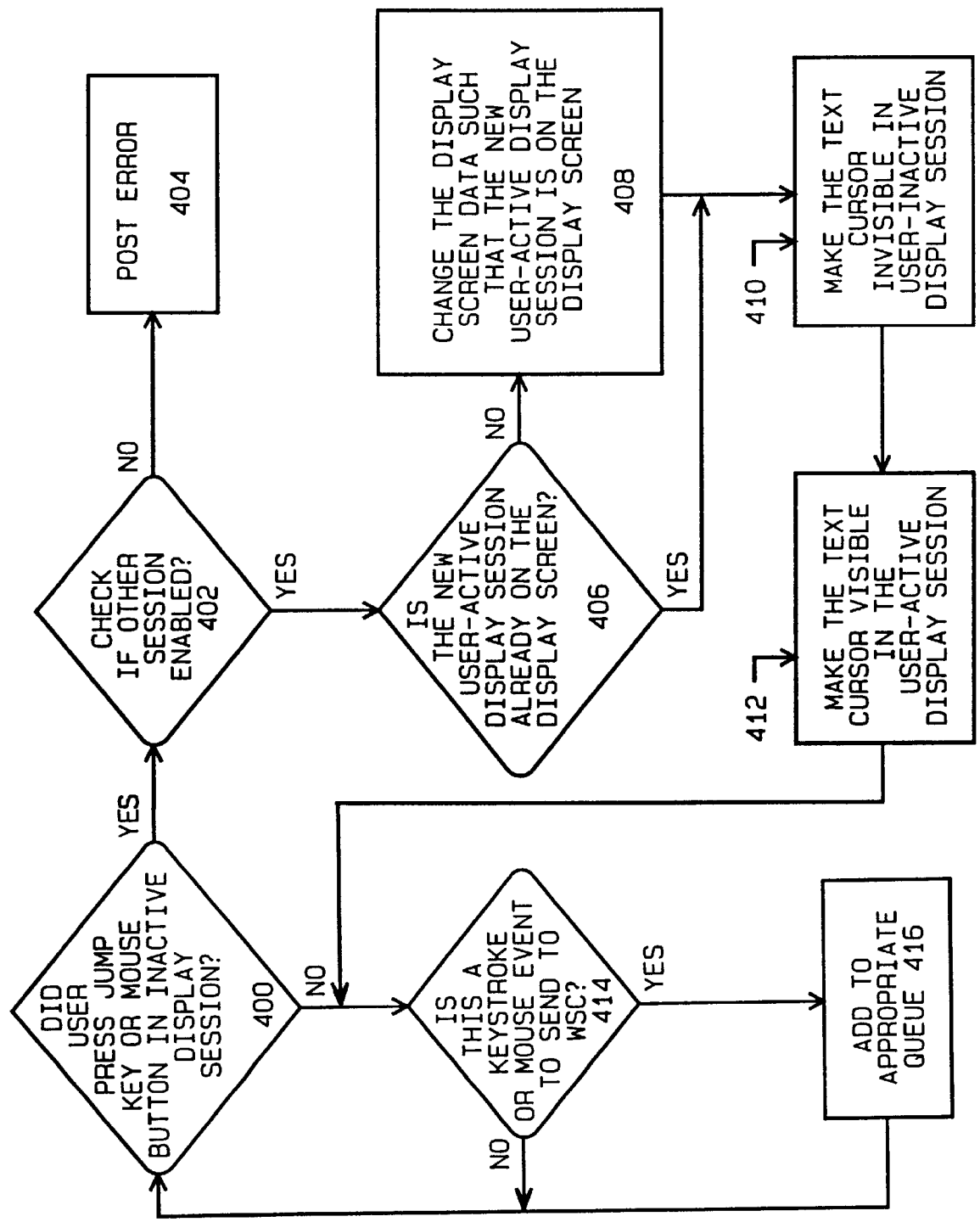
FIG. 4 is a flow chart illustrating the sequential steps for NPT user event processing in accordance with the method of the present invention.

FIG. 4 is a flow chart illustrating the sequential steps for NPT user event processing. The sequential steps begin to identify a jump key or mouse button entry in an inactive display session at a decision block 400 labelled DID USER PRESS JUMP KEY OR MOUSE BUTTON IN INACTIVE DISPLAY SESSION? When a jump key or mouse button entry is identified at block 400, then it is checked whether another session is enabled at a decision block 402 labelled CHECK IF OTHER SESSION ENABLED? If another session is not enabled, then an error is posted at a block 404 labelled POST ERROR. Different errors could be posted; either the user did not select multiple sessions during NPT set-up or the user selected multiple sessions via address sharing in NPT set-up but the WSC does not support address sharing.

Otherwise when another session is enabled, then it is checked whether the new user-active display session is already on the display screen at a decision block 406 labelled IS THE NEW USER-ACTIVE DISPLAY SESSION ALREADY ON THE DISPLAY SCREEN? If the new user-active display session is not already on the display screen, then the display screen data is changed to display the new user-active display screen at a block 408 labelled CHANGE THE DISPLAY SCREEN DATA SUCH THAT THE NEW USER-ACTIVE DISPLAY SESSION IS ON THE DISPLAY SCREEN. Otherwise if the new user-active display session is already on the display screen, then the text cursor is made invisible in the user-inactive display session at a block 410 labelled MAKE THE TEXT CURSOR INVISIBLE IN USER-INACTIVE DISPLAY SESSION. Then the cursor is made visible in the user-active display session at block 412 labelled MAKE THE TEXT CURSOR VISIBLE IN THE USER-ACTIVE DISPLAY SESSION.

After the cursor is made visible in the user-active display session or when a jump key or mouse button entry in an inactive display session is not identified at block 400, then it is checked whether this is a keystroke or mouse event to send to WSC at a decision block 414 labelled IS THIS A KEYSTROKE OR MOUSE EVENT TO SEND TO WSC? If so, the keystroke or mouse event is added to an appropriate queue at a block 416 labelled ADD TO APPROPRIATE QUEUE. Then the sequential operations return to block 400.

FIGS. 5, 5A, 5B and 5C together provide a flow chart illustrating the sequential steps for NPT twinaxial command poll processing. The sequential steps performed by the NPT 14 begin at a block 500 labelled START. Initially, a poll from the WSC 18 is checked at a decision block 502 labelled POLL? If not, then it is checked whether it is a Read Info to Outstanding Status Buffer command at a decision block 504 labelled READ INFO TO OUTSTANDING STATUS BUFFER? If so, then in FIG. 5A following entry point A, it is checked if the user has requested shared addressing during set-up at a decision block 506 labelled HAS USER REQUESTED SHARED ADDRESSING IN SET-UP? If so, then the shared addressing bit flag and the number of requested sessions are set at a block 508 labelled SET SHARED ADDRESSING BIT FLAG AND NUMBER OF REQUESTED SESSIONS. After the bit flag step and when shared addressing was not requested during setup, the read data is sent at a block 510 labelled SEND READ DATA. Then at a block 512 labelled RETURN, the processing returns to block 502 in FIG. 5. When a Read Info to Outstanding Status Buffer command is not identified at decision block 504 in FIG. 5, then it is checked whether it is an Enable Shared Addressing command at a block 514 labelled ENABLE SHARED ADDRESSING COMMAND?

Figure 5:
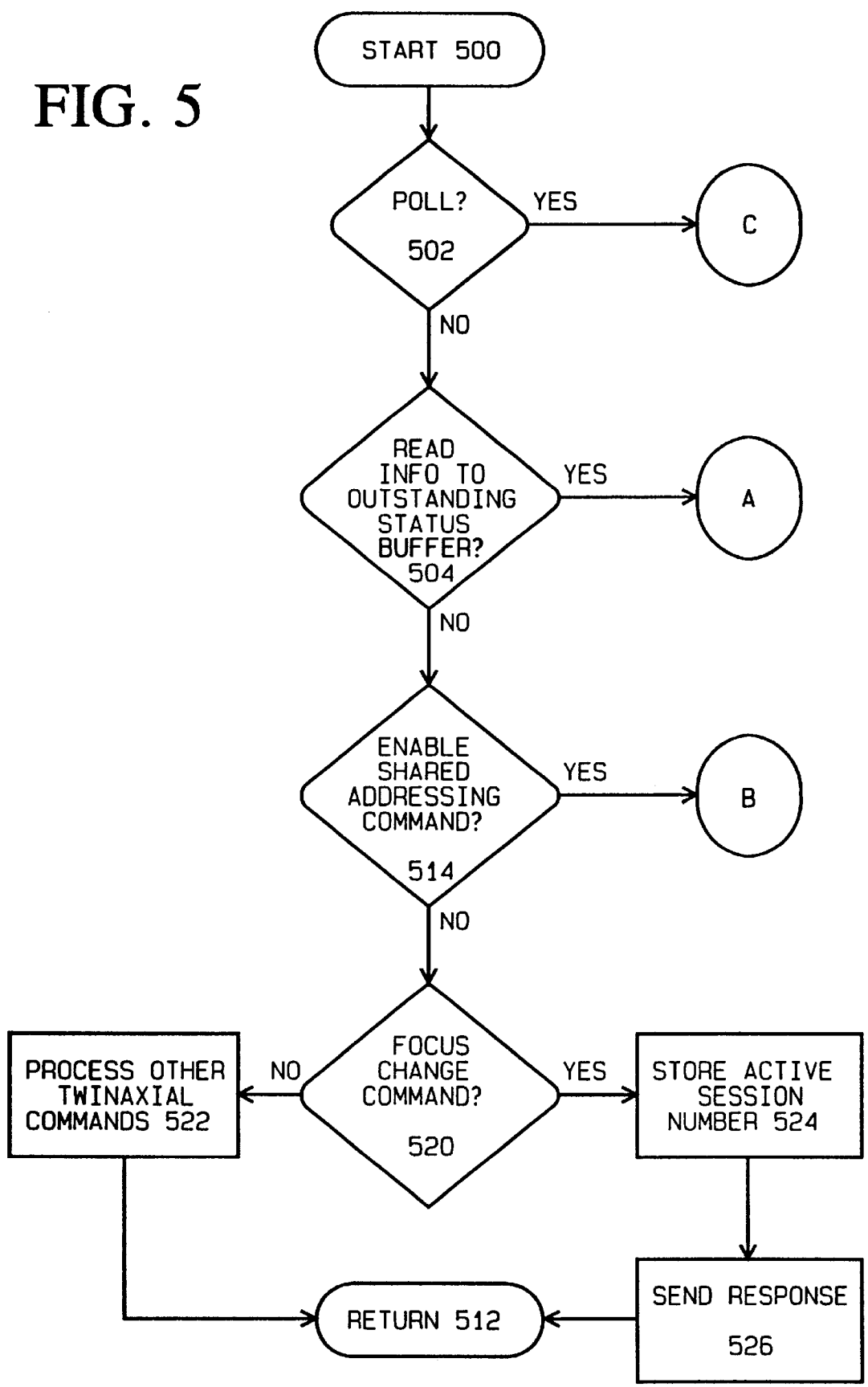
FIGS. 5, 5A, 5B and 5C together provide a flow chart illustrating the sequential steps for NPT twinaxial command poll processing in accordance with the method of the present invention.
Figure 5A:
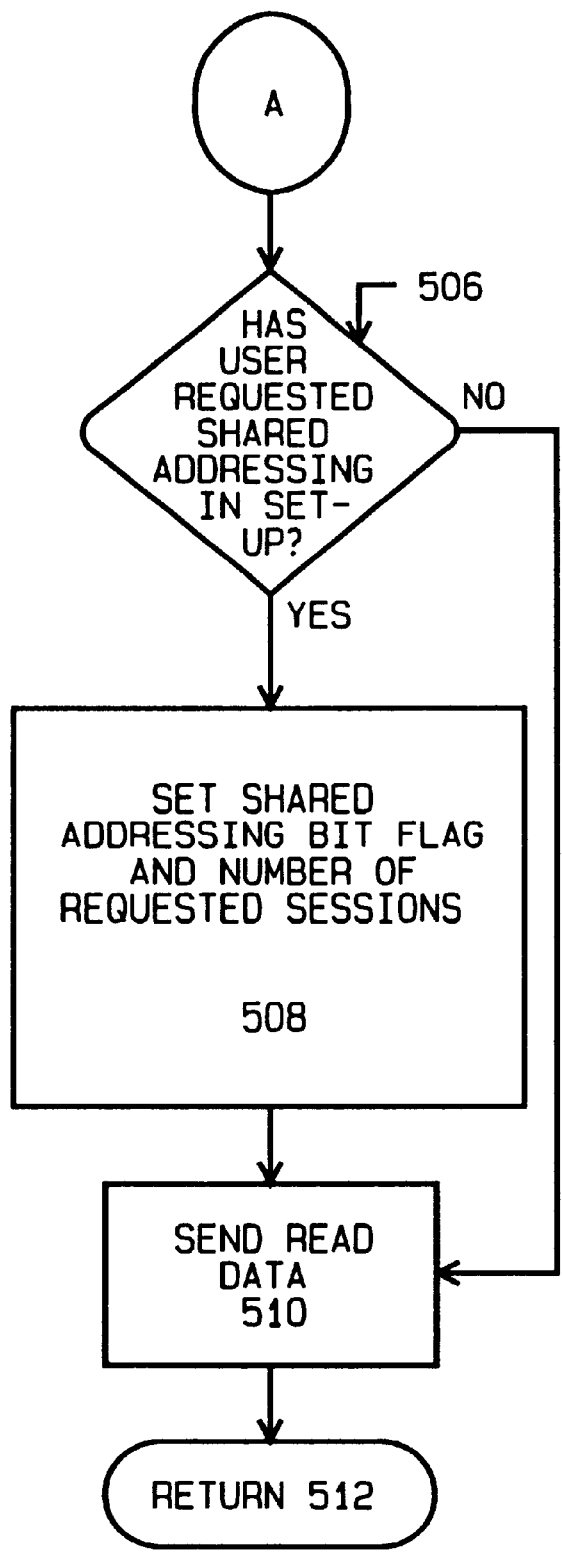
Figure 5B:
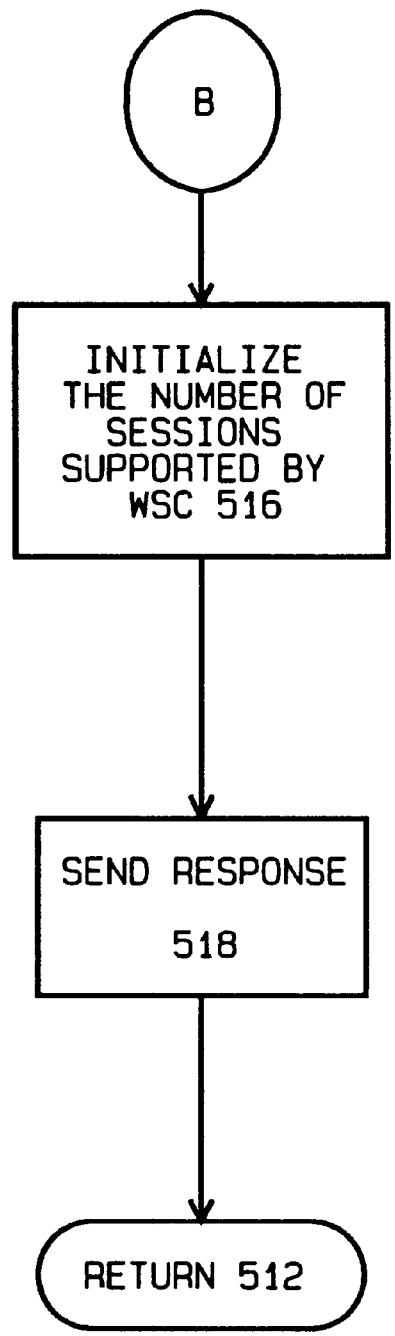

Having reference to FIG. 5B, when an Enable Shared Addressing command is identified at block 514, then the number of sessions supported by the WSC 18 is initialized at a block 516 labelled INITIALIZE THE NUMBER OF SESSIONS SUPPORTED BY WSC, which is less than or equal to the number requested by the NPT. Then a response is sent at a block 518 labelled SEND RESPONSE. Then at a block 512 labelled RETURN, the processing returns to block 502 in FIG. 5.

Referring again to FIG. 5, when an Enable Shared Addressing command is not identified at block 514, then it is checked whether it is a Focus Change command at a decision block 520 labelled FOCUS CHANGE COMMAND? If not, then processing of other twinaxial commands continues at a block 522 labelled PROCESS OTHER TWINAXIAL COMMANDS. When a Focus Change command is identified at a decision block 520, then the active session number is stored at a block 524 labelled STORE ACTIVE SESSION NUMBER. Then a response is sent at a block 526 labelled SEND RESPONSE. Then at the block 512 labelled RETURN, the processing returns to block 502 in FIG. 5.

Figure 5C:
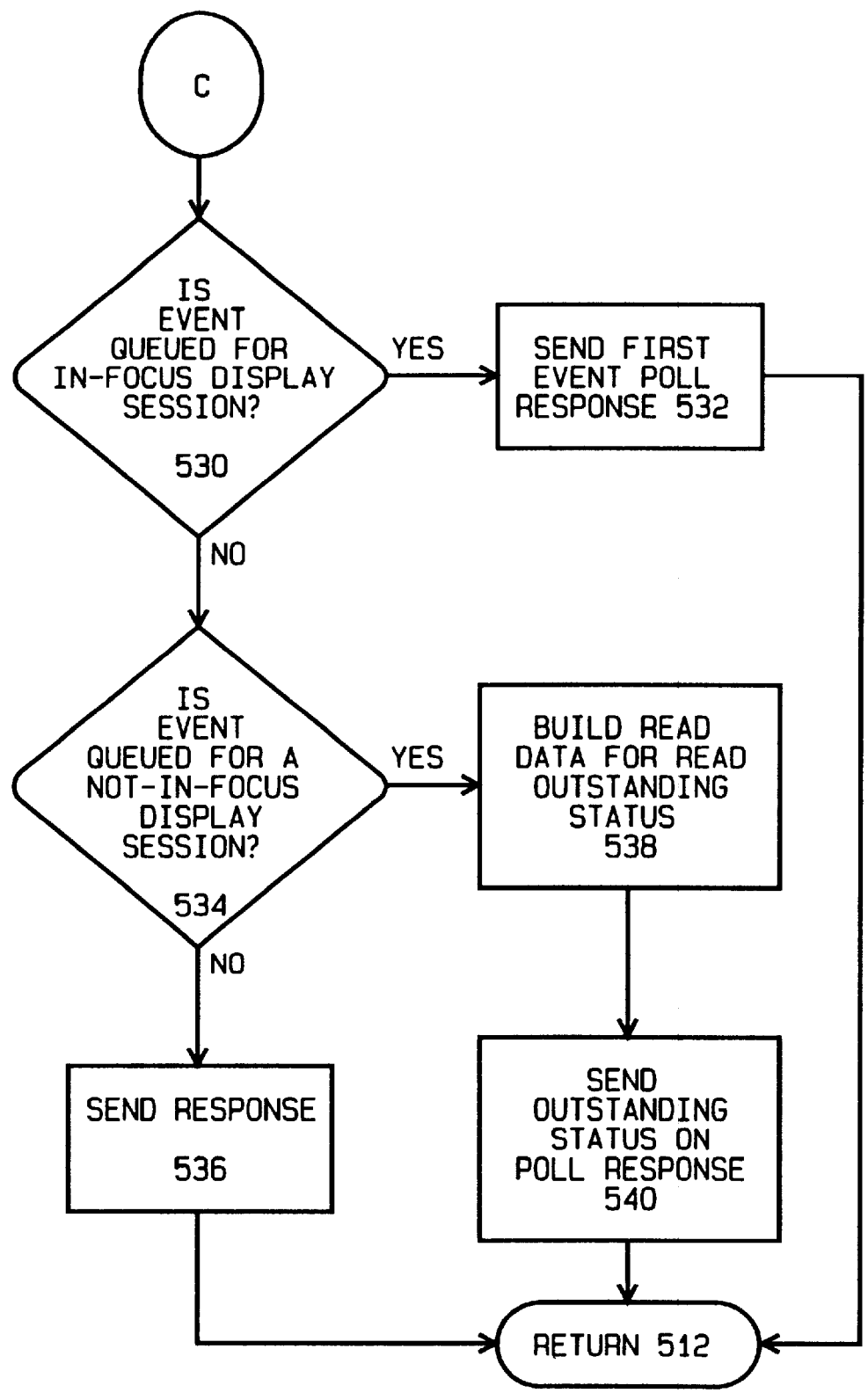

Having reference to FIG. 5C, when a poll is identified at block 502 in FIG. 5, then it is checked whether an event is queued for the in-focus display session at a decision block 530 labelled IS EVENT QUEUED FOR IN-FOCUS DISPLAY SESSION? If so, then a first event poll response is sent and removed from the queue at a block 532 labelled SEND FIRST EVENT POLL RESPONSE. Otherwise if an event is not queued for the in-focus display session at block 530, it is checked if an event is queued for a not-in-focus display session at a decision block 534 labelled IS EVENT QUEUED FOR A NOT-IN-FOCUS DISPLAY SESSION? If an event is not queued for a not-in-focus display session, then a response with no event is sent at a block 536 labelled SEND RESPONSE. Otherwise when an event is queued for a not-in-focus display session, then read data is built for the Read Outstanding Status for the focus change request to the not-in-focus display session at a block 538 labelled BUILD READ DATA FOR READ OUTSTANDING STATUS. Then the outstanding status is sent on the poll response at a block 540 labelled SEND OUTSTANDING STATUS ON POLL RESPONSE. Then at the block 512 labelled RETURN, the processing returns to block 502 in FIG. 5.

Figure 6:
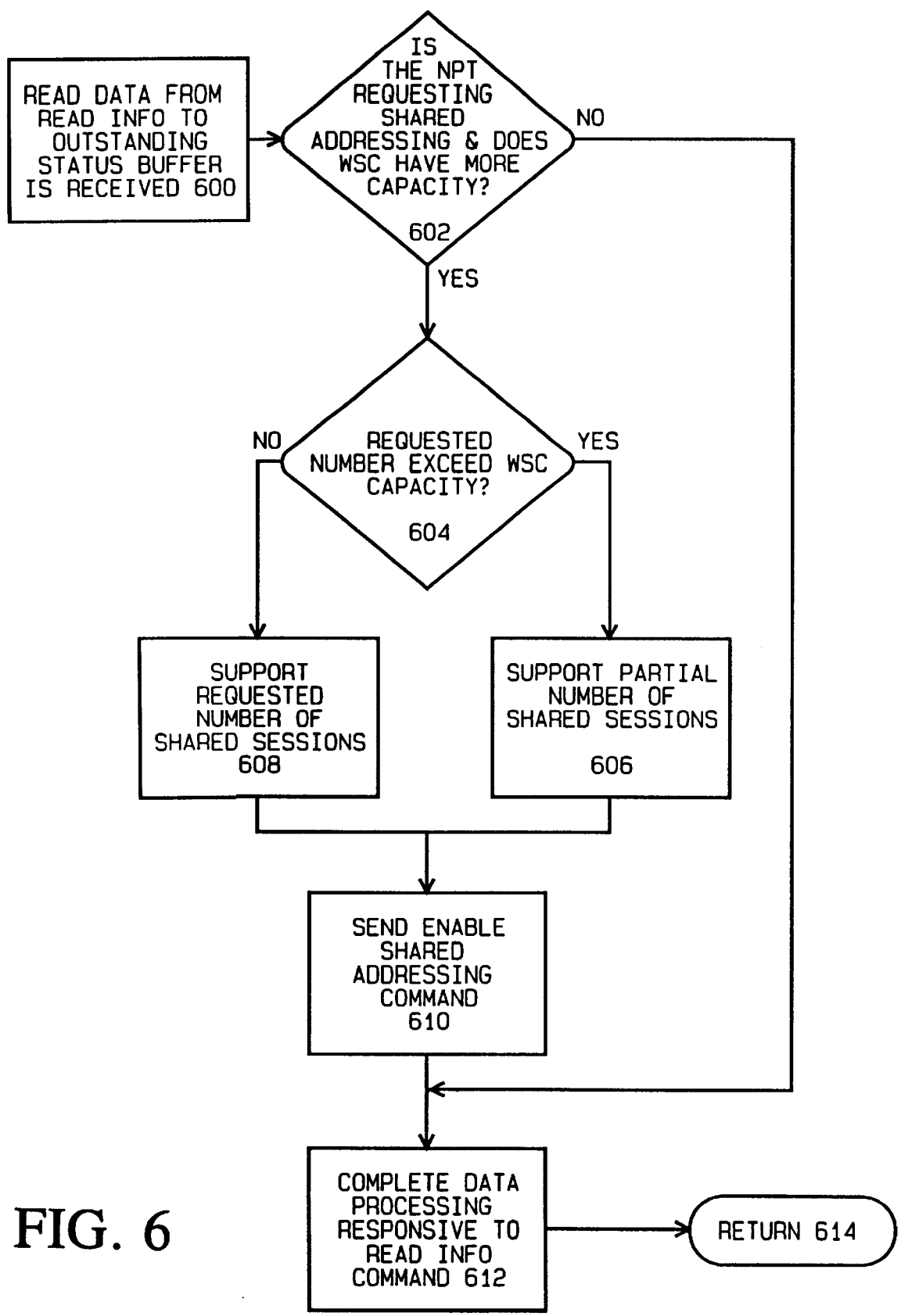
FIG. 6 is a flow chart illustrating the sequential steps for WSC processing bring-up in accordance with the method of the present invention.

FIG. 6 is a flow chart illustrating the sequential steps performed by the WSC for processing bring-up. The sequential steps begin when the read data from Read Info To Outstanding Status Buffer is received at a block 600. Then it is checked whether the NPT 14 is requesting shared addressing and whether the WSC 18 has capacity for more shared sessions at a decision block 602 labelled IS THE NPT REQUESTING SHARED ADDRESSING & DOES WSC HAVE MORE CAPACITY? If so, it is determined if the requested number of sessions would exceed the WSCs' capacity at a decision block 604 labelled REQUESTED NUMBER EXCEED WSC CAPACITY? If so, then the WSCs support a partial number of the requested shared sessions at a block 606 labelled SUPPORT PARTIAL NUMBER OF SHARED SESSIONS. Otherwise, if the requested number of sessions does not exceed the WSCs' capacity, then the WSCs support the requested number of shared sessions at a block 608 labelled SUPPORT REQUESTED NUMBER OF SHARED SESSIONS. Then WSC 18 sends an Enable Shared Addressing command at a block 610 labelled SEND ENABLE SHARED ADDRESSING COMMAND. When the NPT is not requesting shared addressing at block 602 or after WSC 18 sends the Enable Shared Addressing command, data processing is completed responsive to the Read Info Command at a block 612 labelled COMPLETE DATA PROCESSING RESPONSIVE TO READ INFO COMMAND. Then the sequential steps return to block 600 at a block 614 labelled RETURN.

Figure 7:
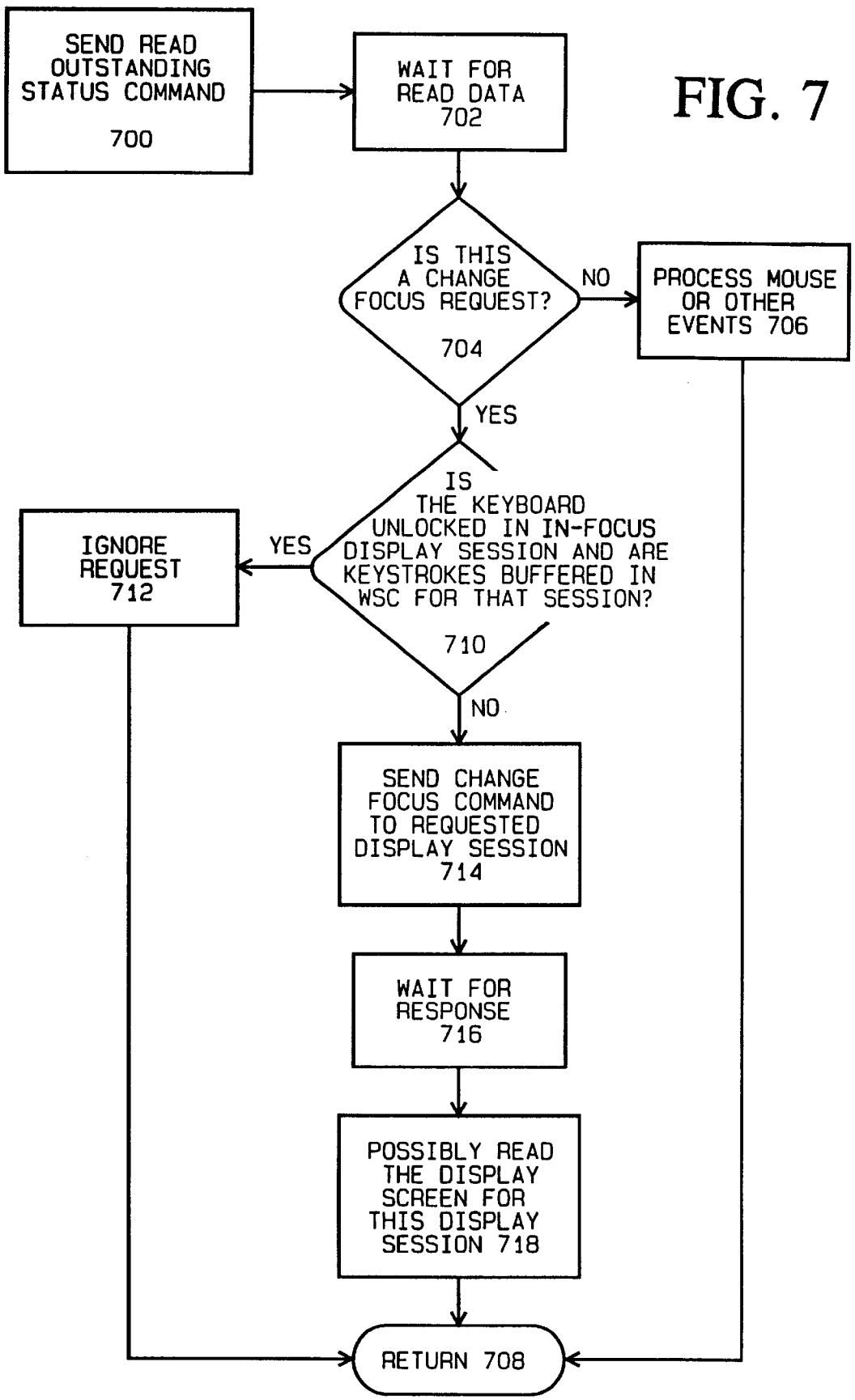
FIG. 7 is a flow chart illustrating the sequential steps for WSC processing of an outstanding status on poll response in accordance with the method of the present invention.

FIG. 7 is a flow chart illustrating the sequential steps for WSC processing of an outstanding status on poll response. The sequential steps performed by the WSC 18 begin with the WSC sending the Read Outstanding Status command at a block 700 labelled SEND READ OUTSTANDING STATUS COMMAND. Then WSC 18 waits for the read data at a block 702 labelled WAIT FOR READ DATA. Then the WSC 18 checks whether this is a change focus request at a decision block 704 labelled IS THIS A CHANGE FOCUS REQUEST? When a change focus request is not identified, then WSC 18 processes mouse or other outstanding status events at a block 706 labelled PROCESS MOUSE EVENTS. Then at the block 708 labelled RETURN, the processing returns to block 700.

When a change focus request is identified at decision block 704, then WSC 18 checks whether the keyboard is currently unlocked in the active display session and if keystrokes are buffered in the WSC for that session at a decision block 710 labelled IS THE KEYBOARD UNLOCKED IN IN-FOCUS DISPLAY SESSION AND ARE KEYSTROKES BUFFERED IN WSC FOR THAT SESSION? If so, then WSC 18 ignores the request and continues processing keystrokes in the currently active display session at a block 712 labelled IGNORE REQUEST. If the keyboard is not currently unlocked in the in-focus display session or keystrokes are not buffered in the WSC for the currently in-focus display session, then WSC 18 sends the Change Focus command to the requested display session at a block 714 labelled SEND CHANGE FOCUS COMMAND TO REQUESTED DISPLAY SESSION. Then WSC 18 waits for a response at block 716 labelled WAIT FOR RESPONSE. Then WSC 18 possibly will read the display screen for the active display session at a block 718 labelled POSSIBLY READ THE DISPLAY SCREEN FOR THIS DISPLAY SESSION. Some WSCs may require an internal buffer in the WSC to maintain the display screen data for in-focus sessions. Some WSCs may not have enough memory to maintain screen image buffers for not-in-focus sessions. Then at the block 708 labelled RETURN, the processing returns to block 700.

Figure 8:
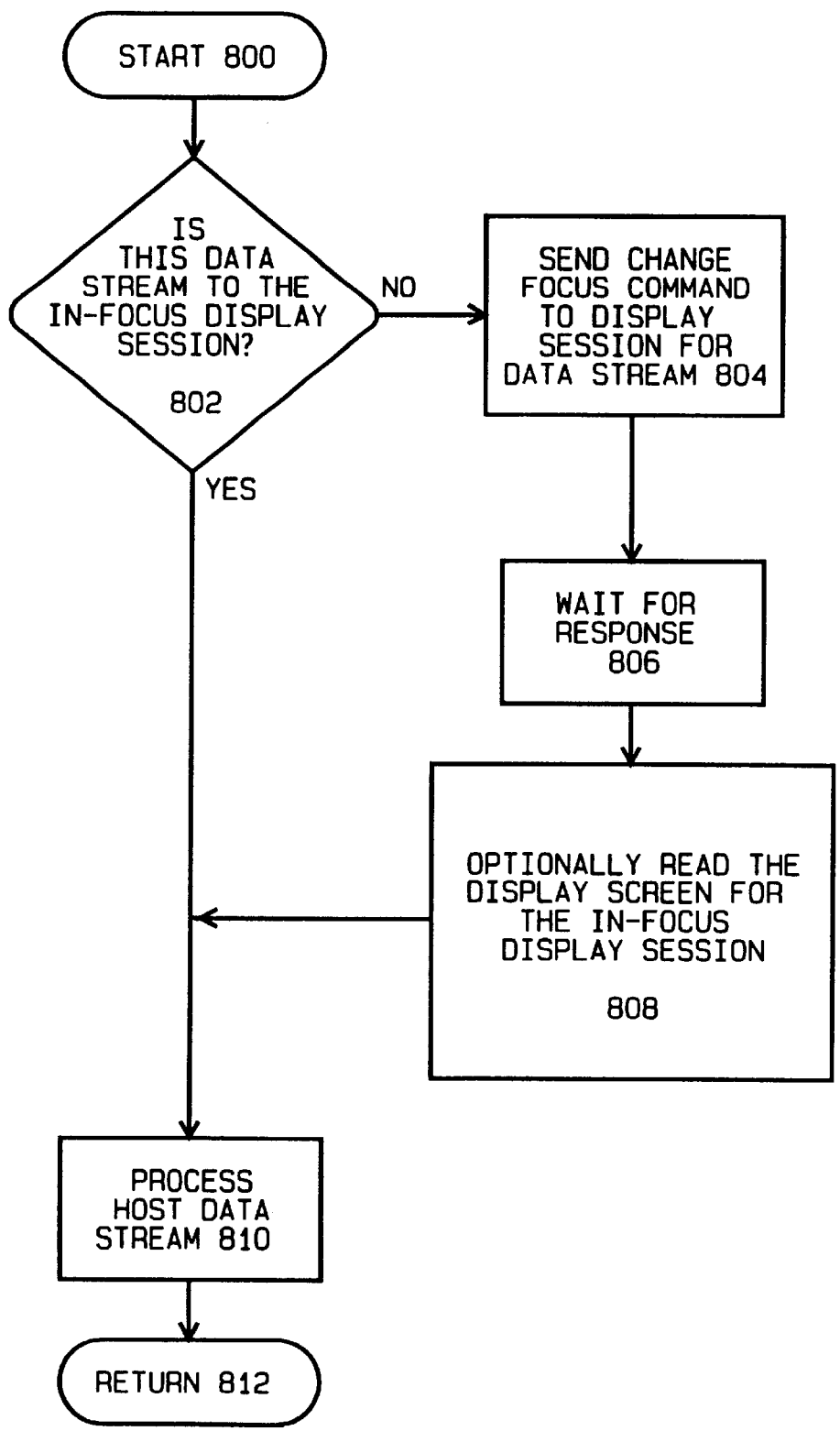
FIG. 8 is a flow chart illustrating the sequential steps for WSC processing a host data stream in accordance with the method of the present invention.

FIG. 8 is a flow chart illustrating the sequential steps for WSC processing of a host data stream. The sequential steps begin at a block 800 labelled START. Initially, WSC 18 checks whether the data stream is for the in-focus display session at a decision block 802 labelled IS THIS DATA STREAM TO THE IN-FOCUS DISPLAY SESSION? If not, then WSC 18 sends a Change Focus command to the display session for this data stream at a block 804 labelled SEND CHANGE FOCUS COMMAND TO DISPLAY SESSION FOR DATA STREAM. Then WSC 18 waits for a response at a block 806 labelled WAIT FOR RESPONSE. Then WSC 18 possibly will read the display screen for the active display session,.for example when the display screen is data stream dependent at a block 808 labelled OPTIONALLY READ THE DISPLAY SCREEN FOR THE IN-FOCUS DISPLAY SESSION. Then the host data stream is processed at a block 810 labelled PROCESS HOST DATA STREAM. When it is determined that the data stream is for the in-focus display session at block 802, then operations also continue to block 810. Then at the block 812 labelled RETURN, the processing returns to block 802.

While the invention has been described with reference to details of the illustrated embodiments, these details are not intended to limit the scope of the invention as defined in the appended claims.

What is claimed is:

1. Apparatus for supporting multiple display sessions through a single address on a non-programmable-terminal (NPT), the NPT attached to a host computer by a work station controller (WSC), the improvement in the WSC comprising:

means for enabling shared addressing of multiple display sessions through the single address on the NPT; said shared addressing of multiple display sessions on the NPT enabling means including means for checking for a shared addressing request in set-up from the NPT and means responsive to an identified shared addressing request in set-up from the NPT for setting a shared addressing flag; and focus change command means for identifying a focus change request from the NPT for a requested display session of the multiple display sessions sharing the single address on the NPT and for changing focus to said requested display session of the multiple display sessions; only one of the multiple display sessions having the focus at any time.

2. Apparatus as recited in claim 1 wherein said means for checking for said shared addressing request in set-up from the NPT includes means for identifying a requested number of display sessions by the NPT, means responsive to said requested number of display sessions for identifying the capacity of the WSC and means responsive to said identified capacity of the WSC for supporting said requested number or for supporting a partial number of said requested number of display sessions.

3. Apparatus as recited in claim 1 wherein said focus change command means for changing focus to said requested display session of the multiple display sessions includes means responsive to an identified focus change request from the NPT for checking a keyboard lock function and buffered keystrokes in the current display session having the focus and means responsive to said checking means identifying said keyboard lock function or buffered keystrokes for ignoring said focus change request.

4. Apparatus as recited in claim 3 further includes means responsive to said checking means not identifying said keyboard lock function or buffered keystrokes for sending a change focus command to said requested display session.

5. Apparatus as recited in claim 1 wherein said focus change command means for changing focus to said requested display session of the multiple display sessions includes means for receiving a host data stream from the host computer for a requested display session, means for comparing said requested display session with the current display session having the focus and means for sending a change focus command to said requested display session responsive to an identified requested display session being different from the current display session having the focus.

6. Apparatus as recited in claim 1 wherein said WSC further includes means for controlling a user interface display session and wherein said focus change command means for changing focus to said requested display session of the multiple display sessions is independent of said user interface display session control means, whereby said user interface display session includes a display session not having focus.

7. A method for supporting multiple display sessions through a single address on a non-programmable-terminal (NPT), the NPT attached to a host computer by a work station controller (WSC), comprising the steps of:

checking, by said WSC, for a shared addressing request in set-up from the NPT;

enabling, responsive to an identified shared addressing request in set-up from the NPT, by said WSC, shared addressing of multiple display sessions through the single address on the NPT;

identifying a focus change request from the NPT for a requested display session of the multiple display sessions on the NPT; only one of the multiple display sessions having the focus at any time; and changing focus, by said WSC, to said requested display session of the multiple display sessions.

8. A method as recited in claim 7 wherein said step of changing focus, by said WSC, includes the steps of receiving a data stream from said host computer for a requested display session, comparing said requested display session with the current display session having the focus and sending a change focus command to said requested display session responsive to an identified requested display session being different from the display session having the focus.

9. A method as recited in claim 7 wherein said step of changing focus, by said WSC, includes the steps of responsive to an identified focus change request from the NPT for a requested display session of the multiple display sessions on the NPT, checking a keyboard lock function and buffered keystrokes in the current display session having the focus and ignoring said focus change request responsive to identifying said keyboard lock function or buffered keystrokes, and continue processing keystroke data in the current display session having the focus.

10. A method as recited in claim 9 further includes the step of sending a change focus command to said requested display session responsive to not identifying said keyboard lock function or buffered keystrokes.

11. A method as recited in claim 7 wherein said step of enabling, by said WSC, shared addressing of multiple display sessions through the single address on the NPT includes the steps of receiving said shared addressing request for a requested number of display sessions by the NPT, identifying the capacity of the WSC, comparing said identified capacity with said requested number of shared display sessions, and supporting said requested number or supporting a partial number of said requested number of display sessions.

12. A method as recited in claim 7 wherein said step of changing focus, by said WSC, is transparent to a user of the NPT.

13. A method as recited in claim 9 further includes the steps of controlling, by said WSC, an active display session not having the focus for a user interface; and communicating with a different display session having the focus.

14. A computer system comprising:

a host computer;

a workstation controller WSC coupled to said host computer;

at least one non-programmable terminal (NPT) coupled by said WSC to said host computer;

said WSC including;

means for enabling shared addressing of multiple display session through a single address on the NPT; said shared addressing of multiple display session on the NPT enabling means including means for checking for a shared addressing request in set-up from the NPT and means responsive to an identified shared addressing request in set-up from the NPT for setting a shared addressing flag; and focus change command means for identifying a focus change request from the NPT for a requested display session of the multiple display sessions sharing the single address on the NPT and for changing focus to said requested display session of the multiple display sessions; only one of the multiple display sessions having the focus at any time.

15. A computer system as recited in claim 14 wherein said NPT includes a personal computer including program means for emulating said NPT.

16. A computer system as recited in claim 14 wherein said WSC includes means for controlling a user interface display session and wherein said focus change command means is independent of said user interface display session controlling means.

17. A non-programmable-terminal (NPT) attached to a host computer by a work station controller (WSC), the NPT comprising:

single address means for enabling communications with the WSC through a single address on the NPT;

means for requesting, in set-up from the WSC, shared addressing of multiple display sessions through the single address on the NPT; and focus change request means for requesting from the WSC, focus change to a requested display session of the multiple display sessions on the NPT sharing said single address; only one of the multiple display sessions on the NPT having the focus at any time.

18. A non-programmable-terminal (NPT) as recited in claim 17 further includes means responsive to receiving a focus change command from the WSC for sending a response to the WSC.

19. A non-programmable-terminal (NPT) as recited in claim 17 further includes buffer memory means for storing a queue of keystroke events.

20. A non-programmable-terminal (NPT) as recited in claim 17 further includes means responsive to receiving a focus change command from the WSC for checking for a queued event in a current display session having focus.

21. A non-programmable-terminal (NPT) as recited in claim 7 further includes means responsive to receiving a Read Info To Outstanding Status Buffer command from the WSC for sending a read data response to the WSC.

\* \* \* \* \*

UNITED STATES PATENT AND TRADEMARK OFFICE
CERTIFICATE OF CORRECTION

PATENT NO. : 6,366,262 B1     Page 1 of 1
DATED : April 2, 2002
INVENTOR(S) : Steven Joseph Amell, Harvey Gene Kiel, Raymond Francis Romon, Shoji Okimoto and Toshio Shimizu It is certified that error appears in the above-identified patent and that said Letters Patent is hereby corrected as shown below:

<u>Column 12,</u>
Line 21, replace "7" with -- 17 --.

Signed and Sealed this

Third day of September, 2002

Attest:

Attesting Officer

JAMES E. ROGAN
Director of the United States Patent and Trademark Office